United States Patent [19]

Hareng et al.

[11] Patent Number: 4,535,327
[45] Date of Patent: Aug. 13, 1985

[54] ELECTRICALLY CONTROLLED DISPLAY USING A THICK LAYER, NON-LINEAR ELEMENT AND ITS PRODUCTION PROCESS

[75] Inventors: Michel Hareng; Jean-Noël Perbet; Michel Graciet, all of Paris, France

[73] Assignee: Thomson-CSF, Paris, France

[21] Appl. No.: 410,558

[22] Filed: Aug. 23, 1982

[30] Foreign Application Priority Data

Aug. 25, 1981 [FR] France ................... 81 16217

[51] Int. Cl.³ .............................. G09G 3/00
[52] U.S. Cl. .................... 340/719; 340/784; 427/101; 357/45; 357/67
[58] Field of Search ............ 340/718, 719, 784; 427/101, 102; 357/45, 51, 67, 68

[56] References Cited

U.S. PATENT DOCUMENTS

| | | | |
|---|---|---|---|
| 4,186,367 | 1/1980 | Chakrabarty et al. | 427/101 X |
| 4,233,603 | 11/1980 | Castleberry | 340/718 X |
| 4,349,496 | 9/1982 | Levinson | 427/102 X |
| 4,403,217 | 9/1983 | Becker et al. | 340/784 X |
| 4,413,883 | 11/1983 | Baraff et al. | 350/333 X |

FOREIGN PATENT DOCUMENTS 2837433 3/1979 Fed. Rep. of Germany .
2104800 4/1972 France .

OTHER PUBLICATIONS

SID International Symposium–Digest of Technical Papers, Apr. 1980, by: D. E. Castleberry et al., "2×5 Varistor-Controlled Liquid Crystal Matrix Display", pp. 198–199.

Primary Examiner—Marshall M. Curtis
Assistant Examiner—Vincent P. Kovalick
Attorney, Agent, or Firm—Oblon, Fisher, Spivak, McClelland & Maier

[57] ABSTRACT

The invention relates to a display using a varistor as the switching element for controlling the orientation of molecules forming a liquid crystal layer. It relates to providing the connections to the elementary cells on an insulating substrate and to forming on said connections varistor contact pieces ensuring a threshold control of the said cells.

9 Claims, 5 Drawing Figures

ELECTRICALLY CONTROLLED DISPLAY USING A THICK LAYER, NON-LINEAR ELEMENT AND ITS PRODUCTION PROCESS

BACKGROUND OF THE INVENTION

The present invention relates to a screen with a matrix access making it possible to represent a figure by breaking it down into a group of points or elements, whose appearance varies as a function of control signals applied to electrodes defining these elements. This screen uses a material, whose optical properties can be electrically modulated. The control signals are applied to the electrodes via non-linear resistors acting as switching elements.

The principle of the flat screen is the breaking down of said screen into M.N identical and generally square or rectangular elements, which can be individually addressed. The definition of the screen is a function of the number of points able to receive a piece of information. Thus, each point must be subject to an electrical field. This is easy to conceive in the case of a screen formed from a few dozen points. However, for high definition screens (above $1.5.10^4$ points) direct access using a wire to each element becomes impossible. For this reason, consideration has been given to an easily realisable matrix-type display. Each element of the screen is then defined by the intersection of two systems of orthogonal conductors called lines and columns and the number of connections passes from M.N to M+N. In the case of a high definition screen, considerable gains occur with respect to the connections.

The addressing of one element of the screen by means of control voltages applied to its line and column does not have to be maintained on adopting a time multiplexing method permitting the state of the screen to be "refreshed" or restored by recurrence. This method is based on a persistence effect, which can be physiological or available within the screen element. In the case of liquid crystal display means, the elementary cell can be likened to a capacitor, whose time constant is adequate to maintain the charge between two successive, temporary addressing operations. For applying the control voltage in a short time, a non-linear resistor is fitted in series with the capacitive cell. The non-linear resistor is a component of the varistor type having an insulating effect on this side of a voltage threshold and which becomes ever more conductive on the other side of this threshold. A convenient way of collectively obtaining the varistor elements consists of using as the substrate a block of varistor material occupying the same extension or size as the screen. However, numerous disadvantages are inherent in this process. It introduces by no means negligible stray capacitances due to the high dielectric constant of the non-linear element. In addition, as the latter is generally a varistor, which is an opaque material, the screen cannot be used in transmission.

BRIEF SUMMARY OF THE INVENTION

The solution proposed here makes it possible to obviate these various disadvantages by using as the substrate a random low permittivity substrate which can be transparent (e.g. of glass) on which are deposited thick layer varistor contact pieces or connections, instead of using the actual varistor as the substrate. Despite their reduced non-linearity, such varistors have adequate characteristics for screens.

The present invention specifically relates to a display for displaying images or pictures by electrical control of elementary display cells on the surface of a substrate, each cell comprising a material, whose optical properties vary as a function of an electrical field created by a first and a second electrode arranged in staggered manner parallel to the said surface and forming a capacitor, each cell being connected to electrical connections carried by the substrate by means of a varistor element, whose resistance is a decreasing function of the voltage applied, wherein the substrate is formed from a refractory dielectric material plate, said elements being constituted by contact pieces of varistor material resting by one of their faces on the said connections and connected by their other face to whichever of the electrodes is closest to the substrate.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS.

Figure 1:
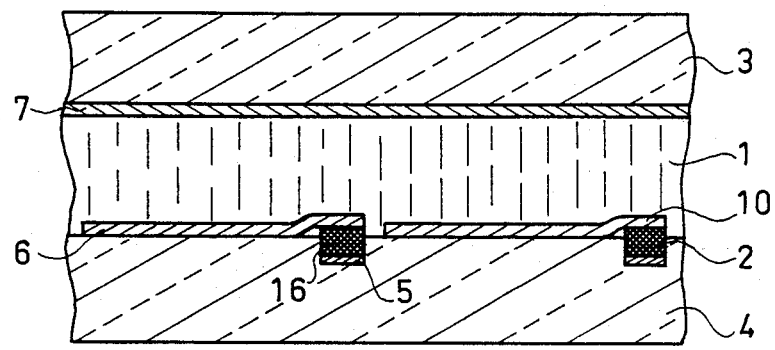
FIG. 1 a sectional view of a display according to the invention.

FIG. 1 shows in the form of a non-limitative embodiment a part sectional view of a display comprising a layer 1 of electro-optical material, whereof each element is controlled by a contact piece or connection 2 made from a varistor type resistive material. Within the scope of the present invention, a liquid crystal layer is used as the electrically controlled display material. This liquid crystal layer is contained in the space left free between the sheets or plates 3 and 4. The spacing of about 10 microns is defined by not shown shims.

It is known to apply an electrical field to a liquid crystal for modifying the orientation of its molecules in order to modulate the incident light. Materials having a mesomorphous phase are formed from longiform molecules which can be oriented in the presence of a solid wall in accordance with a common direction, which can either be parallel or perpendicular to the plane of the wall. The direction of this orientation is dependent on the respective natures of the liquid crystal material and of the wall. The orientation of the long molecules of the liquid crystal is also greatly facilitated by the use of suitable surfactants ensuring a prior treatment of the walls in contact with the film (wiping against the wall, evaporation under glancing incidence of a silicon oxide film). As a function of the effect desired, a mesomorphous material having one or other of the three following phases is used: smectic, nematic and cholesteric.

The liquid crystal layer 1 is electrically controlled by means of electrodes 6 and 7, respectively positioned on plates 4 and 3. Each electrode 6 defines by the contour of its surface, which is approximately 1 mm², a cell respresenting an e.g. matrix access screen element. The control voltages of the liquid crystal layer 1 are supplied by means of line and column connections. When the lines and columns interconnect a plurality of cells, the control of a cell creates an electrically switching field, but other cells which are not to be switched can be the source of undesirable electrical interference fields.

For a point of the screen (i, j) defined by line i and column j to be subject to an electrical field Eij, line i must be at potential Vi and column j at potential Vj. As a result of these potentials present on line i and column j, other points of the electro-optical material can be the source of lower electrical fields giving rise to undesired states. To obviate this defect, it is necessary to ensure that each element of the screen only reacts as from a certain threshold voltage. To this end, it is known to use as the switching element a varistor arranged in series with each point to be excited.

According to this principle, each point of the screen is in series with a varistor (VDR). The latter is a ceramic material, whose conductivity varies greatly beyond a threshold voltage Vs. The theoretical response thereof is then mainly dependent on the threshold voltage Vs:

for V<Vs, the impedance of the varistor is high compared with that of the liquid crystal cell, so that no charging current flows, V being the potential difference at the varistor terminal;

for V>Vs, the impedance of the varistor drops and the electro-optical element receives a charging or discharging current.

When the voltage V again drops below Vs, the impedance of the varistor is again high compared with that of the liquid crystal and the capacitor constituted by the cell slowly discharges with a time constant $\tau$ which is proportional to this capacitance and to the leakage resistance of the system. Thus, such a display must be "refreshed" in a time which is less than the storage time $\tau$ by a new voltage pulse, such that V>Vs. By giving Vs a value well above the threshold of the electro-optical material, it is possible to obtain shorter response times and consequently high multiplexing levels N:

$$N=(T/t)$$

with T=time elapsed between two charge refreshing operations and t=charging time determined by the product R.C in the phase of operation with exceeding of the threshold Vs.

Hereinafter, the term refractory will be used to define any substrate able to withstand without any deterioration of its properties, the temperatures to which it is exposed during the different production phases of the screen.

Using a refractory substrate 4, e.g. a high temperature glass which can be "Corning" glass 7059 with an annealing temperature of 635° C., approximately 100 micronswide conductive access line connections 5 are formed in recesses 16. These line connections, which are parallel to one another and regularly spaced, can be produced by photogravure carried out on a vacuum deposited metallic layer. Thick layer varistor contact pieces 2 are then deposited on these lines.

A varistor basic material is used for producing these contact pieces. The material can be constituted by a zinc oxide powder agglomerate (ZnO) containing particles of bismuth oxide ($Bi_2O_3$) and manganese oxide ($MnO_2$) in order to improve the characteristics of the varistor. The material is in the form of a compact block forming the starting material for the varistor contact pieces according to the invention. This material is finely ground in order to obtain a powder to which is added a binder, e.g. glass. The paste obtained from this mixture is deposited by screen process printing on line connections facing each cell to be excited and is then annealed at 520° C. It is also possible to use an organic binder for preparing the paste to undergo screen process printing, in which case the baking temperature is lower. The thus produced contact pieces have a thickness of about 25 microns.

The varistors have a non-linear resistance and this is highly dependent on the voltage to which they are exposed. These thick layer deposited varistors, despite a less marked non-linearity than varistors produced according to the conventional methods, have adequate characteristics for threshold voltage-controlled displays. Another advantage of this production procedure is the low dielectric constant of the varistor contact pieces of approximately $14\epsilon_o$ ($\epsilon_o$ being the permittivity of the vacuum), which helps to reduce stray capacitances.

Electrodes 6 are then deposited e.g. by evaporation through a mask. They are either reflecting or transparent, depending on whether the screen is used in reflection or in transmission. When used in reflection, it is possible to use aluminium for the electrodes 6, said material having excellent specular reflection properties. In the case of use in transmission, a tin oxide or indium oxide deposit or a mixture of these two oxides is used in exemplified manner.

The line connections 5 supplying the control voltages to electrodes 6 have a reduced width compared with the dimensions of the electrodes, which are the elements having to control the orientation of the molecules of the liquid crystal. Each of the line connections 5 controls a series of electrodes 6 parallel thereto by means of the varistor contact pieces 2. Contact between electrodes 6 and varistor contact pieces 2 takes places by means of small tongues 10 of the same nature as the electrodes.

Plate 3 can be of the same nature as plate 4 and supports on its inner face, a group of transparent column connections 7, which can advantageously be formed by a tin or indium oxide deposit or from a mixture of these two oxides. These column connections are placed, in the present embodiment, orthogonally relative to the rows of electrodes 6, each column covering all the electrodes or the rows which it crosses.

In liquid crystal screens, it is conventional practice to use a crystal having a nematic phase at ambient temperature which uses one of the three following effects: electrically controlled birefringence, dynamic scattering mode or twisted nematics. The latter effect has the interesting property of bringing about a 90° rotation of linearly polarized light propagating perpendicular to the plates. The cell, placed between crossed polarizers, transmits the light at rest and blocks it under a field. Such a use of the cell often requires the plates 3 and 4 to be transparent in the same way as electrodes 6.

The varistor contact pieces 2 and line connections 5 have a reduced surface and do not disturb the transmission of light. This is an advantageous consequence of the invention. In the prior art, the varistor material was used as the substrate and as the material is opaque, it was impossible to obtain a screen working in transmission.

The scope of the invention also covers the use of a nematic—cholesteric mixture having a memory effect and into which can be mixed particles forming a dichroic pigment so as to change the modulating quality of the screen. In this case, the liquid crystal layer is transparent in the rest state. To control the orientation of the liquid crystal molecules, it is possible to use the same procedure as for obtaining a birefringence effect or a dynamic diffusion effect.

A screen which can be used in reflection can be easily obtained by depositing on plate 4 aluminium electrodes serving a mirror function in place of the transparent electrode 6.

The invention also relates to a screen in which each electrode 6 is individually addressed and in which columns 7 are replaced by a single electrode.

Figure 2:
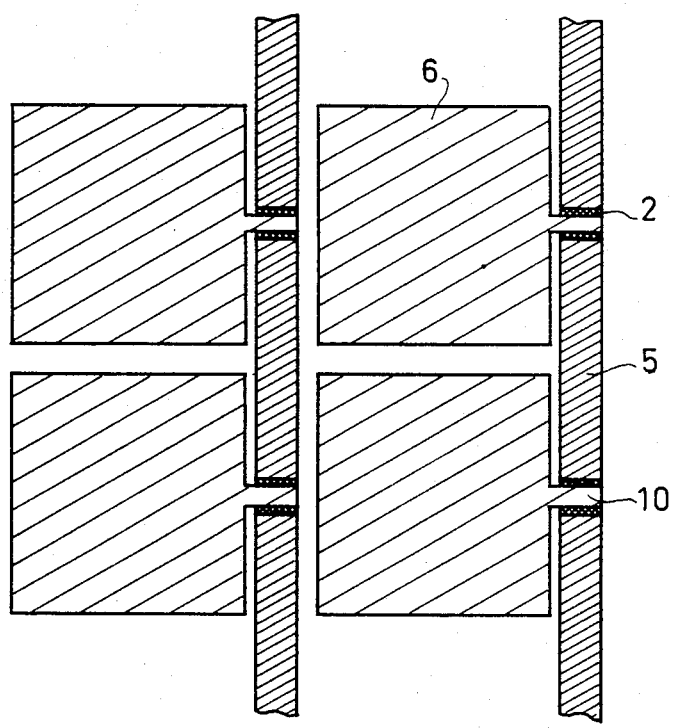
FIG. 2 a plan view of the display of FIG. 1.

FIG. 2 is a plan view of the screen of FIG. 1, in which it is assumed that plate 3 and liquid crystal layer 1 are removed. FIG. 2 better shows the arrangement of electrode 6, line connections 5 and varistor contact pieces 2.

Figure 3:
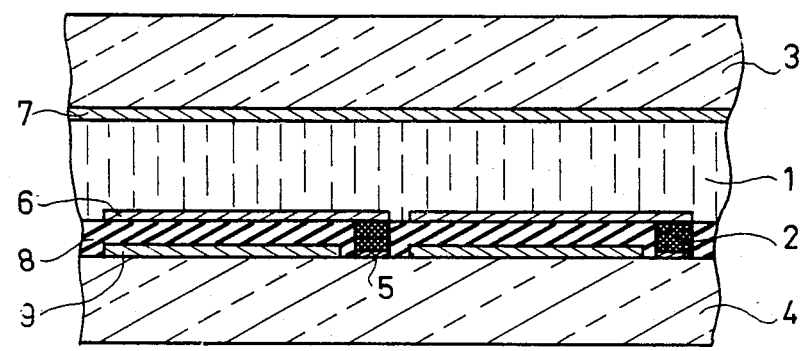
FIG. 3 a part sectional view of the display incorporating storage capacitors.

FIG. 3 is a part sectional view of a variant of the display incorporating storage capacitors. To increase the data time τ resulting from the capacitance and leakage resistances of the electro-optical element, it is impossible to arrange a storage capacitor in parallel on each display means. To this end, a dielectric layer 8 is placed on plate 4. Between plate 4 and dielectric 8, second electrodes 9 are placed in front of each electrode 6 in order to form a capacitor for each display cell. These dielectrics can be produced either in thick layer form for low resolution screens, or in thin layer form for higher resolution screens. The dielectric layer 8 can be a photopolymer produced in thick layer form. However, it can be produced by screen process printing or in thin layer form. For a screen used in transmission, the dielectric layer is produced in thin layer form in order to be transparent and the electrodes 9 are made from tin or indium oxide or a mixture of these two oxides. When the screen is used in reflection, electrodes 9 can be made from aluminium or any other conductive material. In all cases, dielectric 8 must not be porous, in order to ensure that the liquid crystal does not infiltrate into it. It is also possible to use silica.

Figure 4:
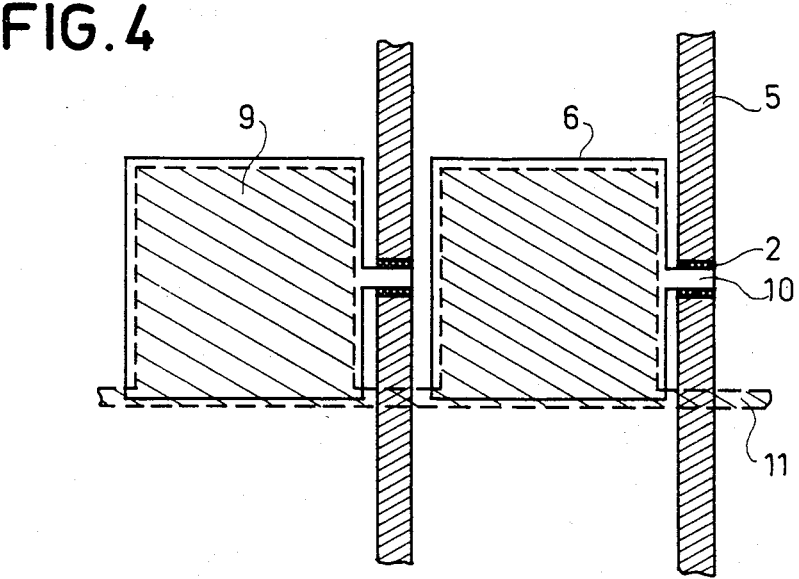
FIG. 4 a plan view of the display of FIG. 3.

FIG. 4 is a plan view of the screen of FIG. 3. It shows the shape and arrangement of electrodes 9. Electrode 6 is common to the display cell and to the storage capacitor. Electrodes 9 are interconnected along the columns parallel to the column connections 7. This is brought about by means of a conductive strip 11 externally connected to the column of the same order or rank.

Figure 5:
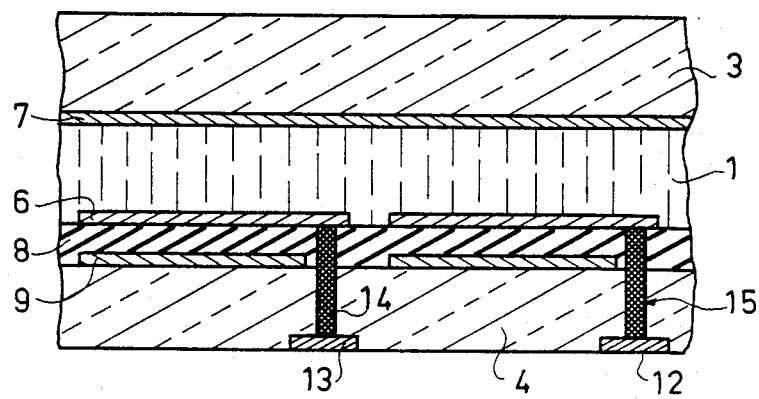
FIG. 5 a part sectional view of a display designed with a so-called volume structure.

The scope of the invention also covers placing the line connections on the outer face instead of the inner face of plate 4. Thus, a so-called volume structure is obtained, as is illustrated in FIG. 5, which is a part sectional view of such a screen. Recesses 12 for the line connections 13 are formed on the outer face of plate 4. This is followed by the deposition of electrodes 9, conductive strips 11 and dielectric 8, which can e.g. be of silica able to resist the baking process. Holes 15 are made e.g. by means of a laser and the aforementioned varistor 14 is positioned there. The assembly is then raised to the varistor baking temperature, followed by the deposition of electrode 6. Thus, each electrode 6 is electrically connected via the varistor element to the corresponding line connections 13. This process has the advantage of not bringing the line connections into contact with the liquid crystal layers.

The concept of a screen according to the invention has the advantage of eliminating stray capacitances introduced by the use of a varistor substrate. These stray capacitances are particularly prejudicial when the screen is used in pulsed manner. Another advantage of the invention is the possibility of using the screen in transmission. This procedure can be used on large screens for operation at television speeds.

What is claimed is:

1. A display for displaying images or pictures by electrical control of elementary display cells on a surface of a substrate, each cell comprising a material, whose optical properties vary as a function of an electrical field created by a voltage applied to a pair of first and second electrodes arranged in staggered manner parallel to said surface and forming a capacitor, each cell being connected to electrical connections carried by the substrate by means of a discrete varistor element for each cell whose resistance is a decreasing function of the voltage applied, wherein the substrate is formed from a refractory dielectrical plate, said discrete varistor elements being isolated from each other and having a first face in contact with said electrical connections and a second face in contact with one of said first and second electrodes.

2. A display according to claim 1, wherein said material is a liquid crystal.

3. A display according to claim 2, wherein the liquid crystal is a nematic—cholesteric mixture.

4. A display according to claim 2, wherein the liquid crystal is a twisted nematic crystal.

5. A display according to claim 2, wherein the liquid crystal incorporates a dichroic pigment.

6. A display according to claim 1, wherein a third electrode for each cell further included on said substrate facing the first electrode to form a capacitor on a side of said first electrode opposite to said material, an insulating layer separating said first and third electrodes, said third electrode corresponding to a cell which is electrically connected by a conductive strip to said second electrode.

7. A display for displaying images or pictures by electrical control of elementary display cells on a surface of a substrate, each cell comprising a material, whose optical properties vary as a function of an electrical field created by a voltage applied to a pair of first and second electrodes arranged in staggered manner parallel to said surface and forming a capacitor, each cell being connected to electrical connections carried by the substrate by means of a discrete varistor element for each cell whose resistance is a decreasing function of the voltage applied, wherein the substrate is formed from a refractory dielectrical plate, said discrete varistor elements being isolated from each other and having a first face in contact with said electrical connections and a second face in contact with one of said first and second electrodes, and wherein said discrete varistor element is arranged to one side of said cell so as to minimize the disturbance of the light being transmitted through in said cell.

8. A display according to claim 1 wherein said electrical connections are located at one side of said cells.

9. A process for the production of a display, wherein contact pieces of a varistor material-based paste are locally deposited on a refractory plate provided with line connections, said plate is then raised to a baking temperature ensuring heat treatment of said paste, first electrodes are then deposited on the refractory plate, each first electrode having an extension deposited in contact with an upper face of one of said contact pieces, second electrodes are then deposited on a second plate which is positioned to face said refractory plate and separated therefrom by spacers, while a layer of etchable material is inserted in the space between the plates, said first and second electrodes forming a capacitor.

* * * * *